Feb. 15, 1955  E. HAHN  2,702,107
DISK CLUTCH AND CONTROL MEANS THEREFOR
Filed Aug. 22, 1952  4 Sheets-Sheet 1

INVENTOR.
Emil Hahn
BY Robert Cobb
Attorneys

Feb. 15, 1955            E. HAHN            2,702,107

DISK CLUTCH AND CONTROL MEANS THEREFOR

Filed Aug. 22, 1952            4 Sheets-Sheet 2

INVENTOR.
Emil Hahn
BY

United States Patent Office 2,702,107
Patented Feb. 15, 1955

2,702,107

DISK CLUTCH AND CONTROL MEANS THEREFOR

Emil Hahn, St. Joseph, Mich., assignor, by mesne assignments, to Lambert Brake Corporation, St. Joseph, Mich., a corporation of Michigan Application August 22, 1952, Serial No. 305,900

11 Claims. (Cl. 192—93)

The present invention relates to friction devices, and more particularly to an improved clutch and control mechanism of a type which may be installed in the conventional change-speed gear transmission of a farm tractor without necessitating any substantial modification of the transmission assembly or of the conventional housing therefor, or used in other installations involving limitations of readily available space.

Clutches of this general type have been heretofore provided which are extremely powerful for their relatively small size by reason of their self-energizing action which increases the torque output thereof in proportion to the load on the clutch. These prior clutches usually have included control mechanisms which constitute a substantial portion of the over-all size of the clutch.

Accordingly, it is a primary object of the present invention to provide a clutch of relatively small size but of extremely high torque capacity, and which includes control mechanism that is so constructed and combined with the clutch proper as to require only a slight amount of space in addition to the space required for the clutch itself. This reduced over-all size of the clutch and control mechanism renders the assembly more readily and simply installable in transmission housings having very little free space in which a clutch may be mounted.

In addition to its usefulness in a power transmission system for farm tractors and the like, the clutch of this invention is also exceedingly well-suited for use in any installation wherein space limitations require a small clutch or friction device, such as in machine tool drives, marine reduction gear drives, automatic transmissions for motor vehicles, truck transmissions and elsewhere.

The primary objective of this invention is attained by the combination of camming elements operative to automatically shift a pressure plate into engagement with cooperative friction discs or the like responsive to load on the clutch tending to cause slippage of the pressure plate relative to the friction discs, and shiftable control means operative upon said camming elements to selectively effect engagement of the clutch or to allow disengagement thereof. In this connection, I utilize a number of radially extended, V-shaped or substantially U-shaped or arcuate ramped seats in one face of the shiftable pressure plate and provide a relatively stationary plate having a corresponding number of similarly shaped and ramped seats disposed in opposed relation to those of the pressure plate. A hardened ball is located in each opposed pair of seats, and an axially shiftable member disposed about the inner or outer periphery of one of the plates is provided with a camming surface with which the balls are engageable. The opposed pairs of seats diverge towards the axially shiftable member, whereby shifting of the latter in one direction will force the balls radially and cause the pressure plate to shift axially away from the stationary plate, thereby engaging the friction discs. Upon initial, sudden or excessive load being applied to the device, the pressure plate and the stationary plate are caused to rotate relative to each other, whereupon the balls climb the opposite sides of the respective ramped seats, thus energizing the device with a powerful self-energizing or servo-action which is proportional to the load thereon.

Another object is to provide a clutch according to the preceding paragraph, in which the axially shiftable member has a cylindrical peripheral face disposed parallel to the axis of the shiftable member and merging with the camming surface thereof, so that the balls will ride off the camming surface and onto the cylindrical surface upon axial shifting of said member in one direction, whereby the operative center of each ball will be engaged with said cylindrical surface to lock the balls in a position with the clutch engaged until the axially shiftable member is deliberately and positively shifted in the opposite direction to disengage the clutch.

In addition to the foregoing, this new arrangement and combination of parts effects a savings in the cost of manufacture by reducing the required number of parts and materials heretofore required to produce a clutch of comparable capacity, durability and quality.

Other objects, advantages and/or uses of this invention will become apparent from the following detailed description taken in connection with the accompanying drawings, and the novel features thereof will be defined in the appended claims.

Figure 1:
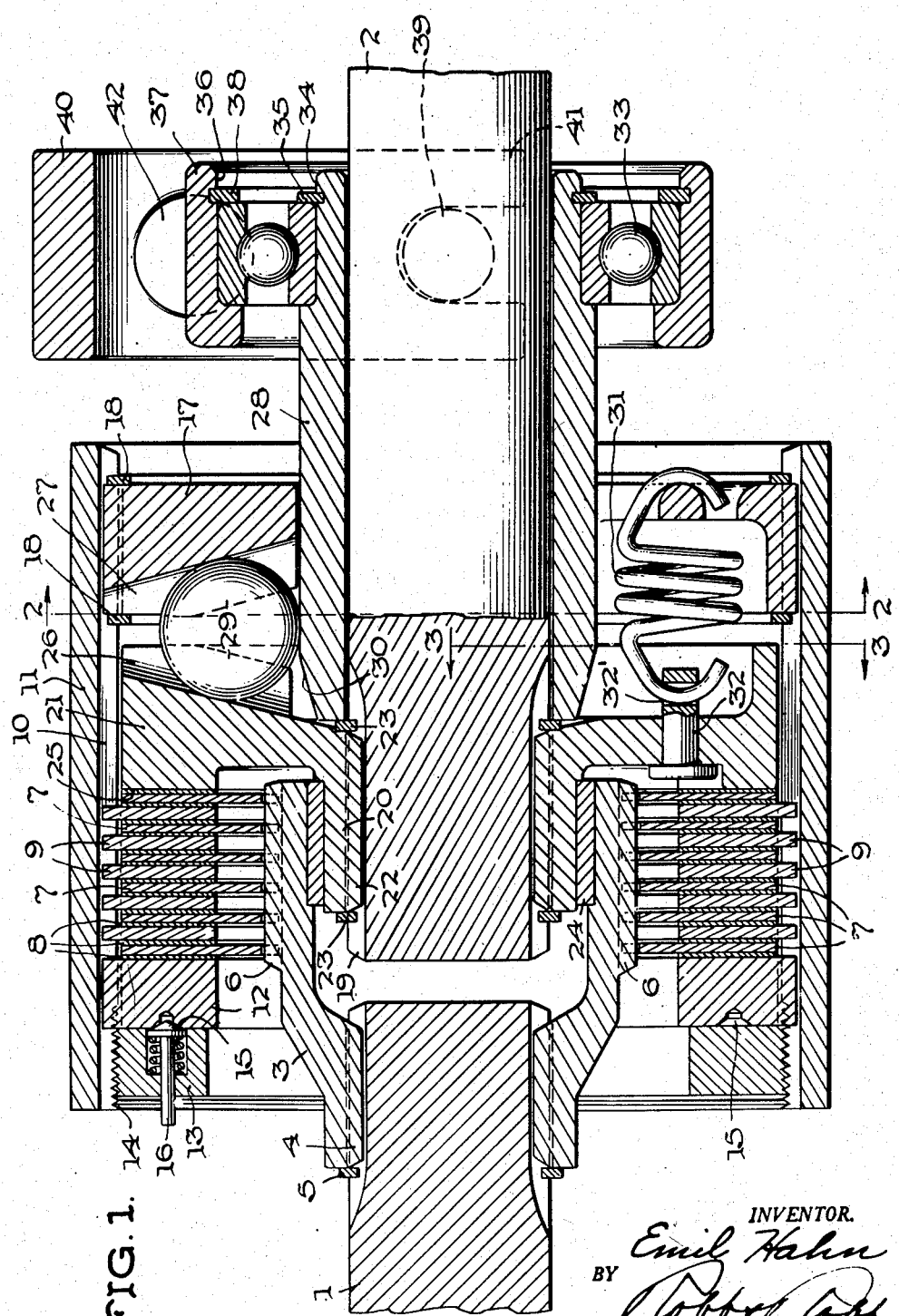
Fig. 1 is a view in longitudinal vertical section of one form of a clutch embodying the present invention, with certain of the parts shown in elevation.
Figure 2:
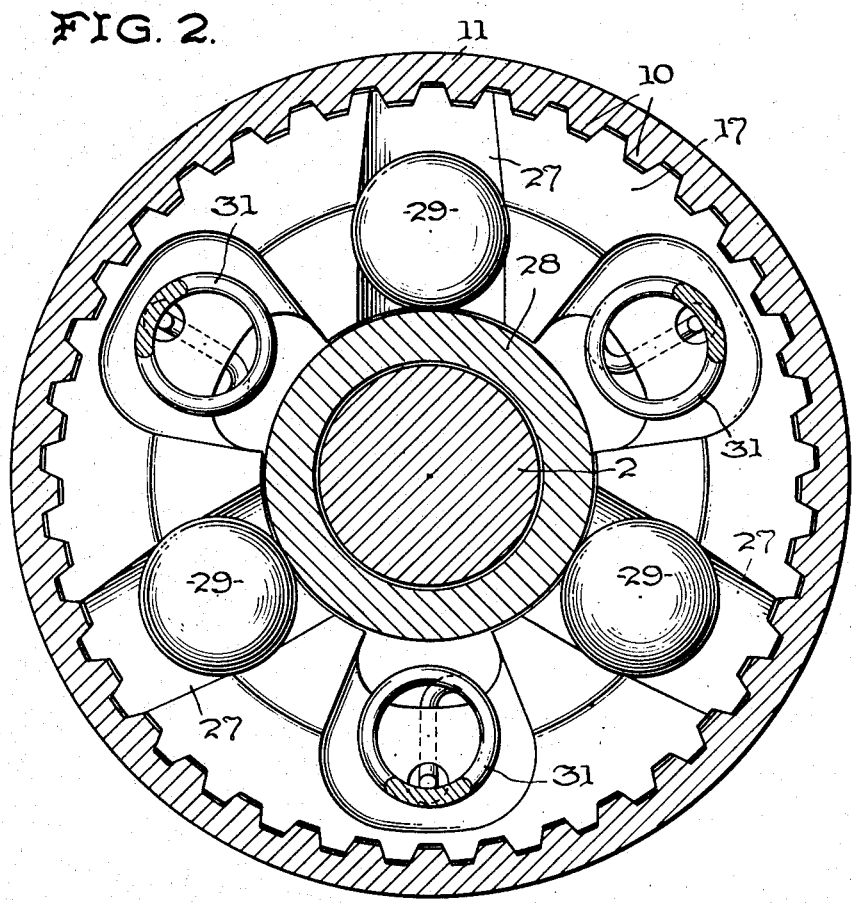
Fig. 2 is a transverse sectional view, as taken on the line 2—2 of Fig. 1, looking in the direction of the arrows, with certain of the parts shown in elevation.
Figure 3:
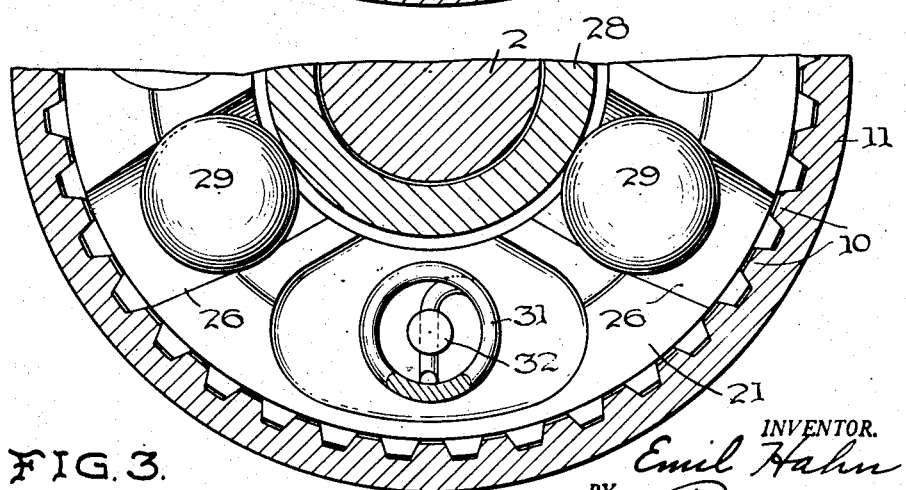
Fig. 3 is a fragmentary, transverse sectional view, as taken on the line 3—3 of Fig. 1, looking in the direction of the arrows, with certain of the parts shown in elevation.

Referring to Figs. 1 to 3 of the drawings, 1 and 2 respectively designate a pair of rotary members such as a power input and a power output shaft, it being immaterial which shaft performs which function. Adapted to be mounted on the shaft 1 for rotation therewith is a hollow sleeve or clutch shaft section 3, preferably having a plurality of splines 4 formed interiorly thereof for complemental engagement with mating splines on the end of shaft 1, and a locking ring 5 is preferably utilized to secure the shaft 3 in position on shaft 1. The outer periphery of the clutch shaft 3 is also provided with splines 6 so as to slidably support a plurality of splined friction discs 7 thereon for rotation therewith. These discs 7 are annular in form and are preferably provided on their radially extended opposite side faces with suitable friction lining material 8 which may be of any desired type, depending upon whether the clutch is sealed for dry operation in a fluid environment, or whether it is to be utilized as a wet clutch operative in a fluid bath.

Disposed intermediate the friction discs 7 are a suitable number of friction discs or rings 9 having splined sliding engagement with longitudinally extended splines 10 formed interiorly of a cylindrical housing sleeve 11. Thus, discs 7 and 9 form a pack of friction discs which are shiftable axially into and out of frictional engagement with each other.

This axial shifting movement of the friction discs 7 and 9 is accomplished by a secondary actuating disc or pressure plate 12 having splined engagement with the splines 10 on the inner periphery of housing 11 for rotation with the housing. The disc 12 is adjustably positioned in the housing by means of an annular, exteriorly threaded lock-nut 13, the radially inward faces of the splines 10 being provided with screw threads 14 for receiving the nut 13. Preferably, the face of disc 12 opposed to the lock-nut 13 is provided with a suitable number of annularly spaced recesses 15, and the lock-nut 13 is provided with a spring-pressed detent 16 selectively engageable in said recesses to prevent the lock-nut 13 from backing out of the threads 14.

At the end of housing 11 opposite the secondary disc 12 is a primary actuating disc 17 of annular form, the outer periphery thereof being in splined engagement with the splines 10 of housing 11. A pair of retaining rings 18, 18, or the like, engaged in circumferential grooves in the splines 10, secure the disc 17 in a fixed position in the housing.

The end of the shaft 2 adjacent to the shaft 1 is suitably splined, as at 19, and a central hub 20 of a power plate or relatively stationary pressure plate 21 is provided with complemental, interior splines 22 for connecting the pressure plate 21 to the shaft 2 for transmitting power from the friction discs to the shaft 2. The splines 19 are suitably grooved annularly so as to seat a locking ring 23 at each end of the hub 20 for securing the power plate 21 against axial shifting movement. Interposed between the outer periphery of the hub 20 and the inner periphery of the hollow clutch shaft 3 is a suitable bearing 24. The power plate 21 has a radially disposed friction surface 25 engageable with the adjacent friction disc 7, so as to impart torque or power from said disc 7 to the shaft 2, or vice versa, according to the direction to which power is transmitted through the clutch.

On the opposite side of the power plate 21 from the friction surface 25, the power plate is provided with a suitable number, preferably three, of radially extended seats 26, these seats preferably being generally U-shaped or arcuate in cross section. The inner side of the primary disc 17 is also provided with a corresponding number of similar seats 27 in opposed relation to the seats 26, thus providing pairs of opposed seats. These seats 26, 27 are oppositely inclined in radial planes so as to diverge towards a control or release sleeve 28, and a hardened ball 29 is disposed in each pair of opposed seats and is engageable by said sleeve 28. The sleeve 28 is slidably positioned on the shaft 2 for axial shifting movements thereon and within the inner periphery of the primary disc 17.

The end portion of sleeve 28 which projects toward the power plate 21 is provided with a beveled camming surface 30 merging with the outer periphery of the sleeve 28. Thus, axial movement of the sleeve 28 towards the power plate 21 when the clutch is disengaged will force the balls 29 generally radially outward incident to riding of the balls 29 up the beveled surface 30; and this shifting movement of the balls will cause the primary disc 17 to be shifted axially away from the power plate 21 by the wedging action of the balls between the seats 26, 27. The primary disc 17, through the intermediary of the housing 11, will thus pull the secondary disc or pressure plate 12 toward the power plate 21, with resultant pressing of the friction discs 7 and 9 therebetween. Any tendency of the output shaft to lag at this time will effect self-energization of the clutch in a manner that will be hereinafter more fully described.

Due to the fact that the sleeve 28 shifts axially towards the power plate 21 to the position shown in Fig. 1, it is seen that the operative center of the balls 29 rides off the beveled face 30, onto the cylindrical portion of the sleeve 28, and the balls 29 are thereby locked in their radially outwardly shifted position by engagement of the balls with the outer peripheral portion of the sleeve 28 which is normal to the operative center of the balls, i. e., with the center of the balls extending diametrically from the point of contact of the balls with the sleeve 28.

For disengaging the clutch, or for resiliently biasing the primary disc 17 towards the power plate 21, I provide a suitable number of tension springs 31 interconnected with these members. One end of each spring 31 is connected to the primary disc 17 in a suitable manner, and the other end thereof is preferably engaged in a hole 32' in the stem of a headed retainer 32 which extends through the body of the power plate 21.

Any suitable operating means may be utilized to shift the sleeve 28 axially on the shaft 2, and for purposes of illustration, one specific embodiment of such operating means is shown, but this operating means forms no part of the present invention, and the invention is not limited thereto.

In this connection, I provide a thrust bearing assembly 33 having its inner race seated on the sleeve 28 in a shouldered annular seat 34, an annular retaining snap ring 35 securing the bearing in place. The outer race of the bearing 33 is seated in a shouldered seat 36 of an annular release collar 37 and secured therein by a snap ring 38, this collar 37 being freely rotatable on the bearing 33 about the sleeve 28. On opposite sides of the collar 37 is a pair of radial projections 39. A yoke 40 spans the collar 37 and has forked ends 41 engaged with said projections 39. Extending from opposite sides of the yoke 40 is a pair of pivot members 42 adapted to be mounted in any suitable stationary support (not shown), and one of said pivots is adapted to extend through the stationary support for connection with suitable operating means such as a hand lever, foot pedal, or the like (not shown). Thus, rocking movements of the yoke 40 on the pivots 42 will effect axial shifting movements of the sleeve 28 to thereby engage the clutch or allow disengagement thereof by the clutch release springs 31.

Assuming shaft 1 to be an input shaft or driving member and shaft 2 to be an output shaft or driven member, the operation of the clutch of Fig. 1 is as follows:

The clutch is shown in an engaged position, with the balls 29 seating on the outer peripheral surface of the sleeve 28 and locked in their radially outwardly shifted position by virtue of the perpendicular relation of this surface and the operative center of the balls. Rocking of the yoke 40 in one direction will shift the sleeve 28 axially to the right, as viewed in Fig. 1, and the balls 29 will roll down the beveled face 30 toward the center of the clutch and inwardly in the opposed seats 26, 27 responsive to the force of springs 31, pulling primary disc 17 towards the power plate 21. Such movement of the primary disc 17 will shift the secondary disc 12 away from the power plate 21, and frictional engagement of the friction discs 7 and 9 will be released.

To engage the clutch, the yoke 40 is rocked in the opposite direction and the sleeve 28 will be shifted axially to the left as viewed in Fig. 1. Such shifting movement of the sleeve 28 will cause the balls 29 to ride up the beveled face 30 and be forced generally radially outwardly between the opposed seats 26, 27. By reason of these seats 26, 27 being angularly related so as to diverge towards the sleeve 28, this radial movement of the balls will force the primary disc 17 axially away from power plate 21, thus shifting the secondary disc 12 towards the power plate 21 so as to compress the friction discs 7 and 9 between the disc 12 and the friction face 25 of power plate 21.

Upon this initial engagement of the clutch, load on the output shaft 2 will cause the same to tend to lag with respect to shaft 1, but the engaged friction discs will rotate and slip slightly relative to power plate 21, with resultant rotation of the primary disc 17 at a speed greater than that of the power plate 21, whereupon the balls 29 will positively cam the plate 21 and the primary disc axially apart responsive to the balls riding in a circumferential direction up the opposite sides of the ramped seats 26 and 27. This action is referred to as a servo-action or self-energizing action and results in an extremely high torque capacity for a clutch of a very small size.

As an illustration of the great capacity of a clutch made in accordance with this invention, the hereinbefore described clutch having such a small size that the shell or housing 11 is only 3½" long and 3⅞" in diameter has more than enough torque capacity to drive a farm tractor which is towing and driving heavy auxiliary farm equipment, such as a combine or the like. And yet, because of its extremely small size, such a clutch may be installed in the conventional transmission housing of a farm tractor, without requiring any substantial modification of the housing or the transmission gear assembly, so as to provide an auxiliary clutch intermediate the conventional power take-off gearing and the final drive of the transmission system, whereby this auxiliary clutch may be disengaged to interrupt movement of the tractor without disengaging the main tractor clutch, thus providing for uninterrupted operation of the power take-off.

Figure 4:
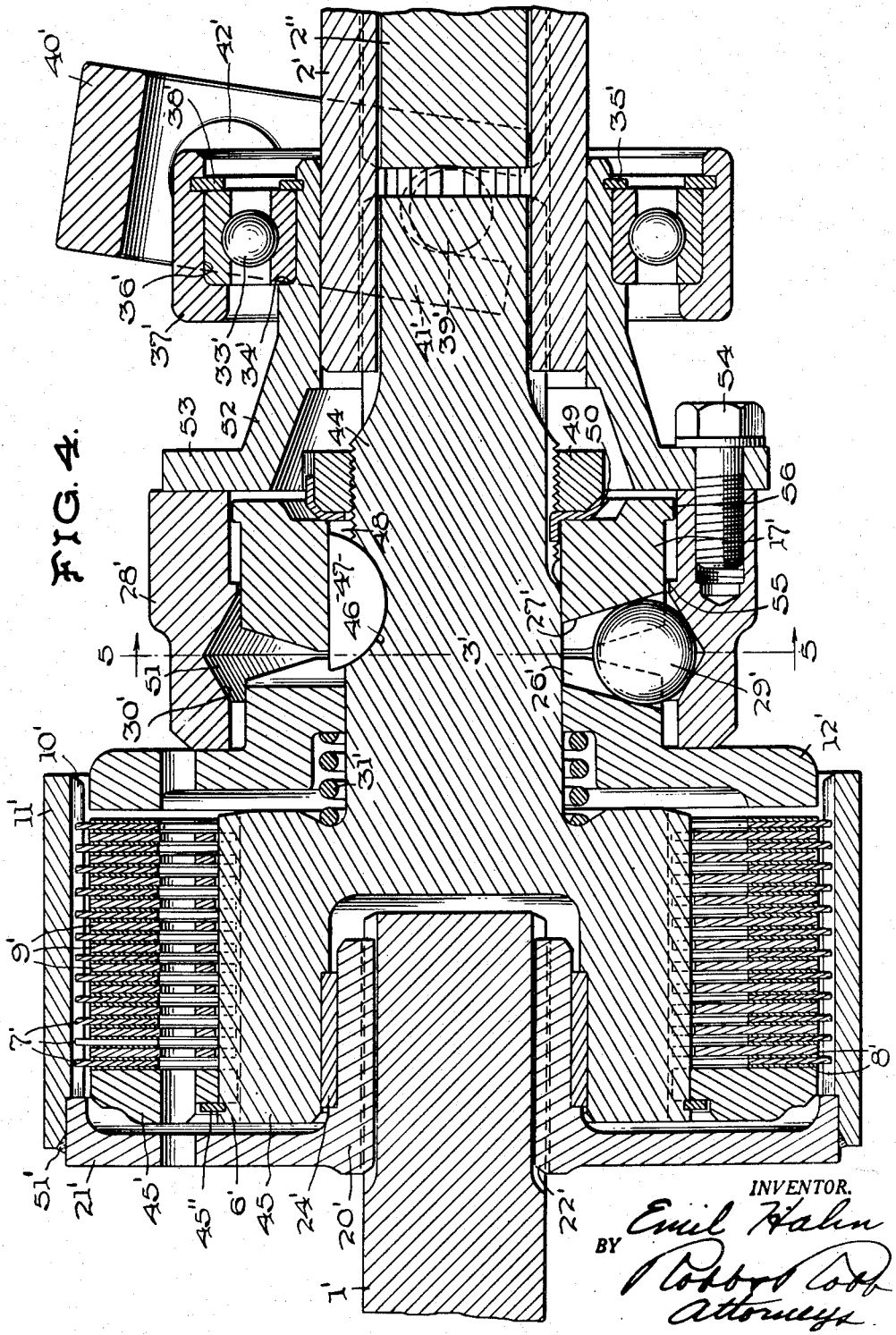
Fig. 4 is a view in longitudinal vertical section of a modified form of clutch embodying the present invention, with certain of the parts shown in elevation.
Figure 5:
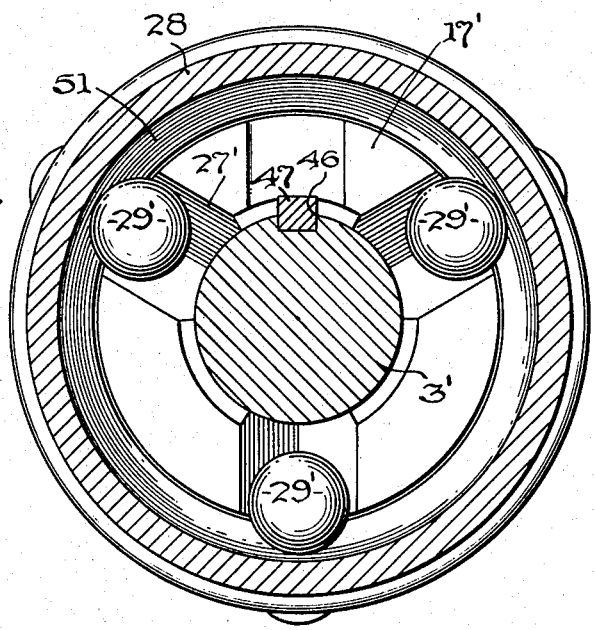
Fig. 5 is a transverse sectional view, as taken on the line 5—5 of Fig. 4, looking in the direction of the arrows, with certain of the parts shown in elevation.
Figure 6:
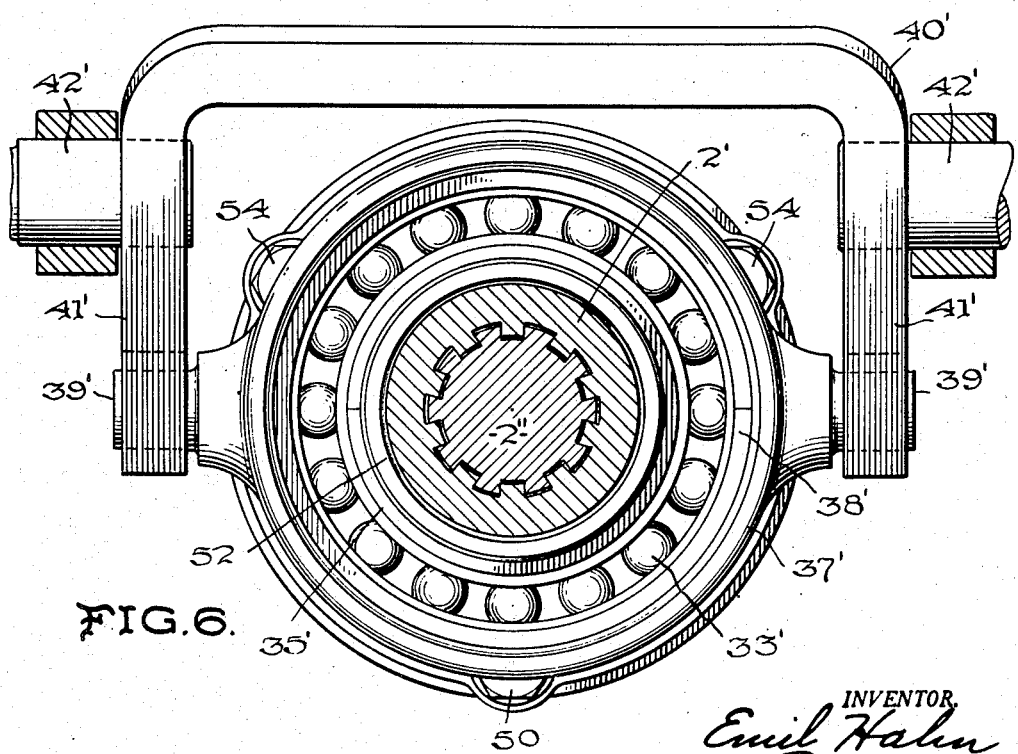
Fig. 6 is a view in elevation of the right-hand end of the clutch assembly of Fig. 4.

A modified form of the clutch control mechanism of this invention is shown in Figs. 4 to 6, in combination with a modified clutch construction which is basically similar to the clutch in Fig. 1, but which differs therefrom in detail. The parts of the clutch in Figs. 4 to 6 are designated by primed reference characters where they correspond in function or construction to the parts of the clutch shown in Figs. 1 to 3.

One of the primary differences between the clutch shown in Fig. 1 and that shown in Fig. 4 is that in the latter clutch, the balls 29' are directly disposed between the primary and secondary actuating discs 12', 17' respectively, and these actuating discs are mounted on the clutch shaft 3', as distinguished from the arrangements of these parts in the former. For this reason, the clutch shaft 3' is provided with an elongated shaft portion 44 having an enlarged, hollow, terminal hub 45. A plate 45' is suitably secured to the free end of the hub 45, and the primary disc 12' is freely mounted on the portion 44 of shaft 3' for axial movement and rotative movement thereon, the secondary disc 17' being keyed to the portion 44 of shaft 3' in axially spaced relation to the disc 12'. The shaft portion 44 is provided with a keyway 46 in which is mounted a key 47, and the inner periphery of the secondary disc 17' has an axially extended keyway 48 in which said key 47 is slidable. The disc 17' may be adjusted axially by means of an interiorly threaded lock-nut 49 threadedly engaged on the shaft portion 44, this lock-nut 49 being secured against inadvertent movement by a lock-washer 50.

The friction discs 7' and 9' are respectively shiftably mounted on the splines 10' and 6' of the cylindrical housing 11' and the hub 45 of clutch shaft 3', and are disposed between the plate 45', which is splined interiorly to engage splines 6', but held against axial movement in one direction by a retainer snap ring 45'', and the primary disc or shiftable pressure plate 12'. Torque is transmitted between the shafts 1' and 2' through the housing 11' which is suitably fixed at one of its ends at 51' by welding or the like, to the power plate 21' which has a hub 20' provided with interior splines 22' adapted to engage complemental splines on the shaft 1'. A bearing 24' is preferably interposed between the hub 20' of the power plate and hub 45 of the clutch shaft 3'.

Resilient means in the form of a compression spring 31' interposed between the hub 45 and the primary disc 12', serves to disengage the friction discs 7', 9' by urging the disc 12' towards the secondary disc 17', and the clutch is actuated by a control sleeve 28' disposed about the outer periphery of the secondary disc 17' and axially slidable thereon. Preferably, the inner periphery of the member 28' is provided with an annular, substantially V-shaped recess 51 having a face 30' inclined relative to the axis thereof, whereby shifting of the member 28' to the right as seen in Fig. 3, or away from the clutch proper, will cause the balls 29' to be forced radially inwardly between the converging seats 26', 27'. The ramped seats 26', 27' are substantially V-shaped in cross section, rather than U-shaped or arcuate as in the clutch of Fig. 1, but the result attained by the oppositely inclined sides of the seats is the same.

A substantially bell-shaped member 52 having a radial flange 53 connected to the end of the member 28' by means of a suitable number of cap screws 54, extends axially from the member 28' and is provided with operating means of any desired type. The operating means shown is identical to that hereinbefore described and therefore need not be further mentioned, except that the member 52 is adapted to be slidably mounted on the shaft 2', which in the illustration is constituted by a splined adapter sleeve which is connected to the end of a shaft 2''.

Preferably, the inner periphery of the member 28' and the outer periphery of the secondary disc 17' are provided with oppositely directed, radially disposed stop shoulders 55, 56, respectively. These shoulders 55, 56 serve to limit movement of the member 28' in a clutch-engaging direction so as to obviate uncovering the seats 26', 27' and consequent dislocation or loss of the balls 29'.

The operation of this form of clutch and control means is as follows, assuming shaft 1' to be an input shaft or driving member and shaft 2'' to be an output shaft or driven member:

The clutch as shown is disengaged, and upon rocking the yoke 40' to the left as seen in Fig. 4, the sleeve 28' will be shifted axially away from the clutch proper, causing the balls to ride up the inclined face 30' and to be forced generally radially inwardly so as to force the primary disc 12' away from disc 17'. The friction discs will thus be shifted up against the stop plate 45' and into engagement, and torque or power transmitted to the friction discs by the power plate 21' and the housing 11' will be transmitted to the clutch shaft 3'. The member 28' is shiftable to such an extent as to engage the stop shoulders 55, 56, at which time the operative center of the balls 29' will have ridden off of the inclined face 30' and will be seating on the cylindrical inner periphery of the member 28' so as to be locked in the radially inwardly shifted position. Since the freely mounted primary disc 12' is engaged with a friction disc 7' carried by the housing 11', load on the clutch tending to cause the clutch shaft 3' to lag will cause the secondary disc 17' to lag behind the primary disc 12'. Whereupon, the balls 29' will ride up the opposite sides of the ramped seats 26', 27' in a circumferential direction to thereby energize the clutch with a powerful servo-action proportional to the load.

Disengagement of the clutch is accomplished by merely rocking the yoke 40' in the other direction to allow the balls to be shifted outwardly into the annular seat 51 responsive to movement of primary disc 12' toward disc 17' under the bias of the release spring 31'.

While the specific details of the present invention have been herein described in connection with two illustrative embodiments thereof, the invention is not limited thereto, since changes and alterations may be resorted to without departing from the spirit thereof as defined in the appended claims.

I claim:

1. In a friction device having friction elements shiftable into and out of engagement, certain of said friction elements being adapted to be connected to one member and other of said friction elements being adapted to be connected to a member which is rotatable relative to the first member, and means for shifting said elements into frictional engagement, that improvement wherein said last-mentioned means comprises a pair of relatively rotatable and axially shiftable discs, one of which discs constitutes one of said friction elements, shiftable camming means interposed between said pair of discs for spreading said discs axially apart to engage said friction elements responsive to shifting movements of said camming means and responsive to relative rotation between said pair of discs upon engagement of said friction elements, means for shifting said camming means, and means for operating said shifting means for the camming means, said discs having a pair of radially extended opposed seats diverging towards the margin of the discs, said seats having oppositely inclined side walls, one side wall of each seat being disposed in opposed spaced relation to a side wall of the other seat, and said camming means comprising a ball engaged in said pair of seats between the opposed side walls of the seats.

2. A friction device as defined in claim 1, wherein said operating means comprises an annular member concentrically disposed with respect to said discs and having an axially inclined annular camming face thereon engageable with said ball to force said ball toward the apex of said pair of diverging seats.

3. A friction device as defined in claim 1, wherein said operating means comprises a member having a camming face thereon engageable with said ball to force said ball toward the apex of said pair of diverging seats, and said operating member also having locking means engageable with said ball for locking said friction elements in engagement, said locking means comprising a surface on said operating member merging with said camming surface and disposed parallel to the axis of the operating member.

4. A friction device as defined in claim 1, wherein one of said discs is formed with a central opening, said means for shifting the camming means comprising a member having one end extending through said opening into engagement with said ball, said seats diverging towards said member, and said end of said member having a beveled face merging into a face parallel to the axis of the discs.

5. A friction device as defined in claim 1, wherein said seats diverge towards the outer periphery of said discs, said means for shifting said camming means comprising a member disposed adjacent to the periphery of said discs and engaged with said ball, and said member having a beveled face merging into a face parallel to the axis of the discs, said parallel face providing means for locking said friction elements in engagement.

6. Control mechanism for a friction device, comprising a pair of discs adapted to be mounted on a support in opposed axially spaced relation so as to be relatively shiftable axially and rotatively, said discs having opposed cam seats, said seats each having a side wall disposed in opposed spaced relation to a side wall of the other seat, shiftable camming means in said seats and between said opposed side walls for spreading said discs axially apart responsive to shifting movements of said camming means and responsive to relative rotation between said discs, and means including an axially shiftable element having a camming surface engageable with said camming means for shifting said camming means, said axially shiftable element comprising a cylindrical member concentrically disposed with relation to one of said discs, with one slidably mounted on the other, one end of said cylindrical member projecting towards the other disc, said opposed seats diverging towards said cylindrical member, and said camming means comprising a ball engaged in the opposed seats and with said cylindrical member, said cylindrical member having an inclined portion for camming said ball radially between the seats aforesaid.

7. Control mechanism as defined in claim 6, wherein said axially shiftable member also has a surface parallel to the axis thereof merging with said inclined surface and engageable with said ball to maintain the ball in a radially shifted position.

8. Control mechanism as defined in claim 6, wherein the disc which is concentrically disposed with relation to the cylindrical member is disposed about the outer periphery of said cylindrical member, and the inclined portion of said cylindrical member merges with the outer periphery of the cylindrical member, the outer periphery of said cylindrical member constituting means engageable with the ball for maintaining the ball in a radially shifted position.

9. Control mechanism as defined in claim 6, wherein the cylindrical member is disposed about the outer periphery of the disc which is disposed in concentric relation thereto, and the inclined portion of the cylindrical member merges with the inner periphery of the cylindrical member, the inner periphery of said cylindrical member constituting means engageable with the ball for maintaining the ball in a radially shifted position.

10. A clutch adapted to be connected to a driven member and a driving member, comprising a clutch shaft adapted to be connected to one of said members, a cylindrical shell concentrically disposed about and spaced from said clutch shaft, friction discs slidably carried by said clutch shaft and said cylindrical shell respectively, a power disc keyed on one of said members and having a friction face engageable with one of said friction discs on the clutch shaft, a cylindrical control sleeve adapted to be slidably mounted on one of said members, a primary disc carried by said shell in axially spaced relation to said power disc and slidable on said control sleeve, a secondary disc carried by said shell on the opposite side of said friction discs from said power disc, said power disc and said primary disc having opposed radially extended ramped seats in the opposed faces thereof, said seats diverging towards said control sleeve, a ball between said opposed seats, said control sleeve having a camming surface engageable with said ball to force the same radially for spreading said power disc and said primary disc axially apart, and resilient means biasing said last-mentioned discs towards each other.

11. A clutch adapted to be connected to a driven member and a driving member, comprising a clutch shaft adapted to be connected to one of said members, a cylindrical shell concentrically disposed about and spaced from said clutch shaft and adapted to be connected to the other member, friction discs slidably carried by said clutch shaft and said cylindrical shell respectively, a relatively stationary pressure plate on said clutch shaft, a primary actuating disc freely mounted on said clutch shaft on the opposite side of said friction discs from said pressure plate, a secondary actuating disc fixed on said clutch shaft in axially spaced relation to said primary disc, an axially shiftable control member slidable on said secondary disc and extending towards said primary disc, said primary disc and said secondary disc having opposed, radially extended, ramped seats in the opposed faces thereof, said seats diverging towards said control member, a ball between said opposed seats, said control member having a camming surface engageable with said ball to force the same radially for spreading said primary disc and said secondary disc axially apart, and resilient means biasing said last-mentioned discs towards each other.

References Cited in the file of this patent

UNITED STATES PATENTS

| 1,751,809 | Glisch | Mar. 25, 1930 |
| 2,205,833 | Henroid | June 25, 1940 |
| 2,244,169 | Miller | June 3, 1941 |
| 2,401,864 | Gerst | June 11, 1946 |
| 2,626,692 | Sloan | Jan. 27, 1953 |

FOREIGN PATENTS

| 436,016 | Great Britain | Oct. 3, 1935 |
| 645,904 | Great Britain | Nov. 8, 1950 |